Dec. 16, 1958

F. PARODI 2,864,371

DEVICE FOR THE CONTROL OF ELECTRICAL SUPPLY FOR
ELECTROTHERAPEUTIC PURPOSES, ESPECIALLY
FOR STIMULOTHERAPY

Filed June 13, 1955

INVENTOR
F. PARODI
By Wilkinson & Mawhinney
ATTYS.

United States Patent Office 2,864,371
Patented Dec. 16, 1958

2,864,371

DEVICE FOR THE CONTROL OF ELECTRICAL SUPPLY FOR ELECTROTHERAPEUTIC PURPOSES, ESPECIALLY FOR STIMULOTHERAPY

Felice Parodi, Florence, Italy, assignor to Casther S. A., Pantin, France, a corporation of France Application June 13, 1955, Serial No. 515,204

Claims priority, application France June 14, 1954

13 Claims. (Cl. 128—419)

The purpose of the invention is a device for the control of electrical supply intended to produce, during a given time, a pulsated electric current, obtained from a non-by-passed rectified alternating current, or a modulated direct current, this current being applied to the patient by means of a pair of electrodes with well-defined characteristics, and the intensity of the current applied requiring to be of a determined and fixed value, whatever the resistance of the patient, the time and intensity given capable of being variable or at least capable of being selected from a series of predetermined fixed values.

Said control device is more particularly intended to be used in combination with a pair of electrodes with a well-defined surface, the assembly of the pair of electrodes and the control device forming an electro-therapeutic apparatus utilisable, for example, for the electrical treatment of certain pulmonary troubles, by stimulotherapy, as is stated in said application.

More particularly, the control device is used in combination with a set of several of these pairs of electrodes, the electrodes having, for the various pairs, different and regularly graded application surfaces.

Preferably, the current should be progressively established in a time $t_1$; maintained constant during a time $t_2$ then progressively brought back to zero in a time $t_3$, the values $t_1$, $t_2$, $t_3$ being predetermined and the duration $t_2$ of the application of the constant intensity current must also be capable of being chosen from among several predetermined fixed values.

In fact, the conditions laid down by therapeutic technique require the operator employing this apparatus to have available:

Several pairs of treatment electrodes of different sections enabling well-defined portions of surfaces to be radiated;

Several values of current density, corresponding to the various methods of therapeutic effect;

Several values of application times.

For example, in the form of embodiment that will be described in detail, the apparatus according to the invention enables three pairs of electrodes to be used, having respectively 200, 150 and 100 cm.² area, four current densities, also respectively at 5, 10, 20 and 50 microamperes/cm.² corresponding to the methods designated hereinafter by I, II, III and IV and two application periods, being 4 min. and 6 min., including the time for the rise and fall of intensity which are each 30 seconds.

It will easily be seen that for the intensity of the treatment current there are ten different values, for each of these values, the intensity must be kept constant, within very small tolerances, whatever the electric body resistance of the patient, which, as is known, is capable of varying within very wide limits.

The invention moreover seeks to produce an apparatus that is subjected to the following additional conditions:

The above-mentioned parameters must be capable of being selected or altered in a practically instantaneous manner, the risks of error or faulty handling requiring to be as reduced as possible;

This apparatus must be simple to handle and not require special knowledge in the electric or electronic field;

This apparatus must not be dangerous to use, either for the patient or the operator.

These various aims have been achieved in the apparatus according to the invention, which consists of a device for the control of electrical supply (or control desk) for electro-therapeutic purposes, more particularly for stimulotherapy, available for supplying a pair of treatment electrodes with a well-defined surface, said desk being remarkable, more particularly in that it comprises in combination a pulsated current generator, a device for regulating the application time of the current, a group of resistances enabling this current to be adapted to the intensity corresponding to the area of the electrodes and the density of the current selected, this adaptation being calculated for a resistance between electrodes arbitrarily chosen from the mean of the resistances found experimentally, and a device for regulating intensities maintaining the intensity at the value selected, whatever the actual electrical resistance of the patient.

According to one feature of the invention, the apparatus comprises several pairs of electrodes, each capable of being fed under several densities of different currents, and, according to the pair of electrodes and the density of the current selected, the necessary connections are made, on the one hand, by branching the pair of electrodes selected, and on the other hand, by a single operation branching in the circuit of the treatment current the suitable resistance of said group of resistances, and making the suitable connection on the current generator enabling a modulated tension to be obtained of suitable value.

According to another feature of the invention, said group of resistances is formed by shunts that can be selectively mounted in shunt on a circuit in which the intensity is kept constant by said regulating device.

According to a preferred alternative scheme of the invention the apparatus comprises a device for regulating the time for making and breaking the current.

The device for regulating intensity, the device for regulating the time and the device for making and breaking the current can be either electro-mechanical or electronic devices.

Other features and advantages will appear in the description that follows.

Figure 1:
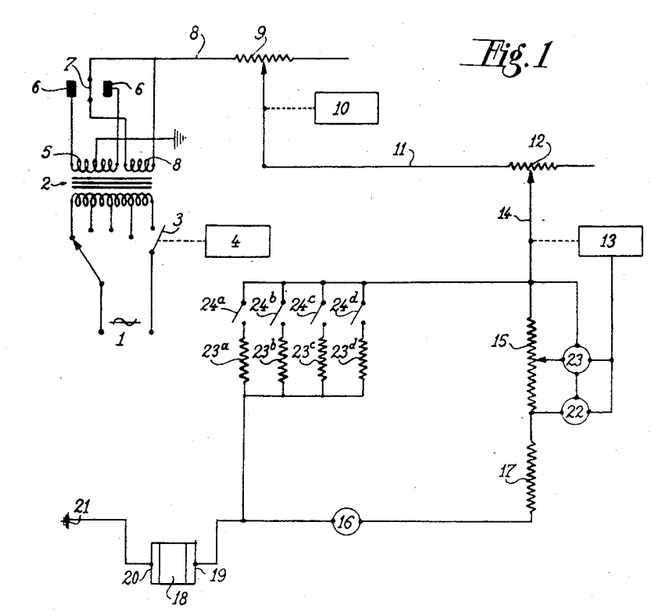
Fig. 1 is an electric diagram of the principle of the control desk according to the invention.

According to the diagram giving the principle which is shown in Figure 1, the apparatus is supplied by a source of alternating current delivered at the terminals 1. If this apparatus is intended to be used on supply circuits of different or variable tensions, it may comprise a first general feed transformer which may, for example, be an autotransformer (not shown) with multiple plugs, restoring the voltage of the supply circuit to a certain fixed voltage, 110 v., for example, for which the apparatus is constructed. In this case it is this auto-transformer which forms the current source applied to the terminals 1. This source feeds one or more transformers intended to supply the various voltages utilisable in the apparatus, namely, on the one hand, the voltage required for the pulsated current generator, and on the other hand, the various auxiliary voltages, used for the heating and high tension feed of electronic tubes, driving the motors, pilot lamps, etc.

For the purpose of clearness, these transformers intended to supply these various auxiliary voltages have not been shown in this diagram.

A transformer 2 whose primary may comprise several plugs (four are shown by way of example) is intended for producing the treatment current. The primary comprises a device enabling the current to be established or cut off in the primary winding, shown by a switch 3 controlled by a device called a "total time regulator."

The secondary is formed by a winding 5 whose middle point is earthed and whose two ends are connected to the plates 6—6 of a double rectifying diode whose filament 7 is fed under reduced voltage by another secondary winding 8, as is known.

From the filament 7 of the valve 6 starts a conductor 8 which is thus traversed by a non-by-passed rectified current, and which forms part of the treatment circuit, which constitutes the essential part of the apparatus.

This current successively traverses a resistance 9 adjustable by means of a device 10 called a "regulator for the rise and drop of the current," a conductor 11, a regulating resistance 12 whose value is regulated by a device 13 called an "intensity regulator," a conductor 14, a fixed resistance 15, a galvanometer 16 provided with a fixed resistance 17, the treatment electrode 18 branched between a positive terminal 19 and a negative terminal 20, the latter being earthed at 21. On the assembly formed by the resistances 15, 17 and the galvanometer 16, there is mounted in shunt a certain number of resistances 23a, 23b, 23c, 23d, etc., called "density shunts" mounted in parallel with regard to each other and able to be branched by means of switches 24a, 24b, 24c, 24d, etc.

Lastly, a device for controlling regulating comprising two thyratrons 22—23 is connected, on the one hand, to the resistance 15, and on the other hand, to the device 13 in such a way that any intensity variation passing in the resistance 15 acts on these thyratrons which themselves, through the intermediary of the device 13, act on the value of the resistance 12 to keep the intensity constant in the resistance 15 and consequently, in the shunt utilised and the electrode 18.

Figures 2, 3, 4, 5:
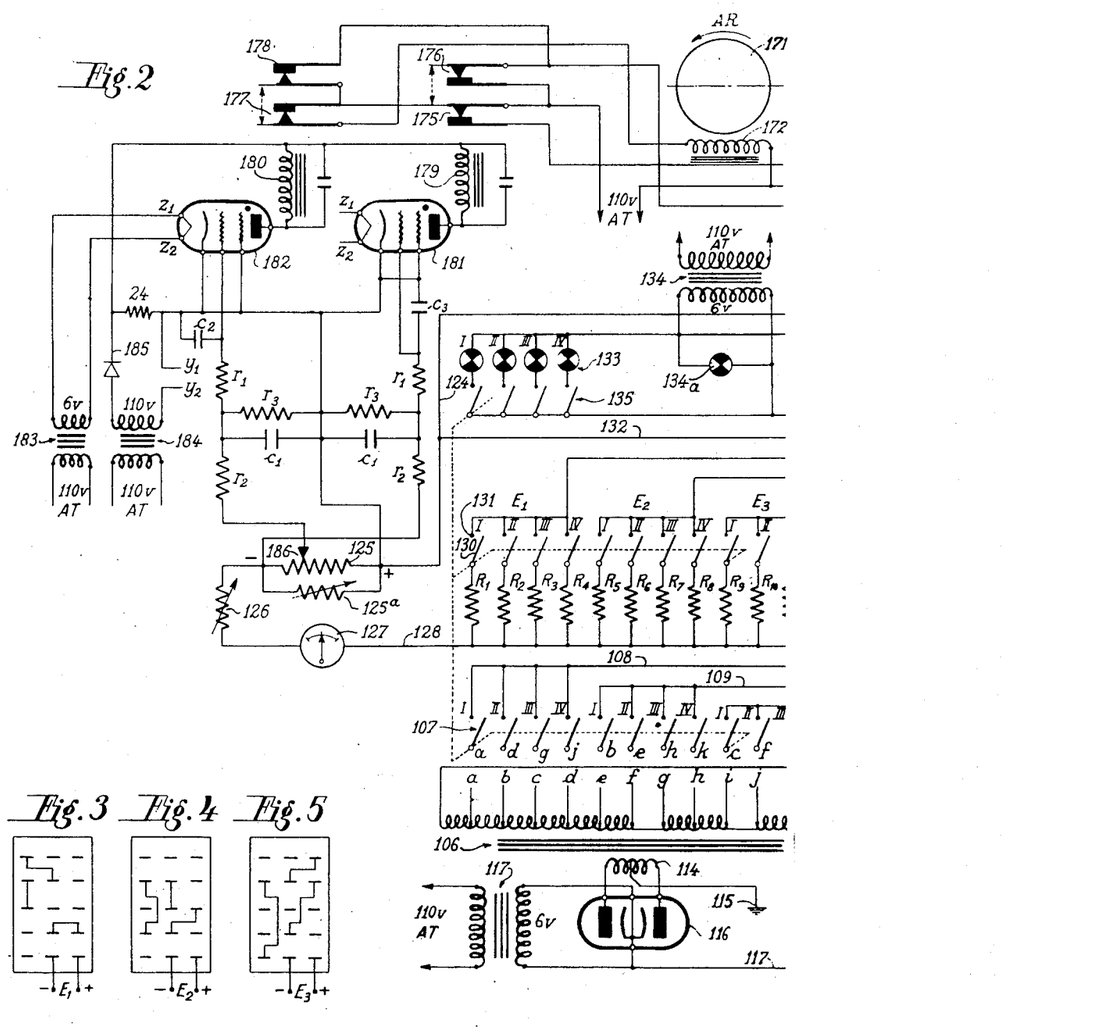
Figs. 2 and 2A are a detailed electric diagram of a first form of embodiment of this desk.
Figs. 3, 4 and 5 show the connections of a male plug for electrodes used in combination with the desk according to the invention.
Figure 2A:
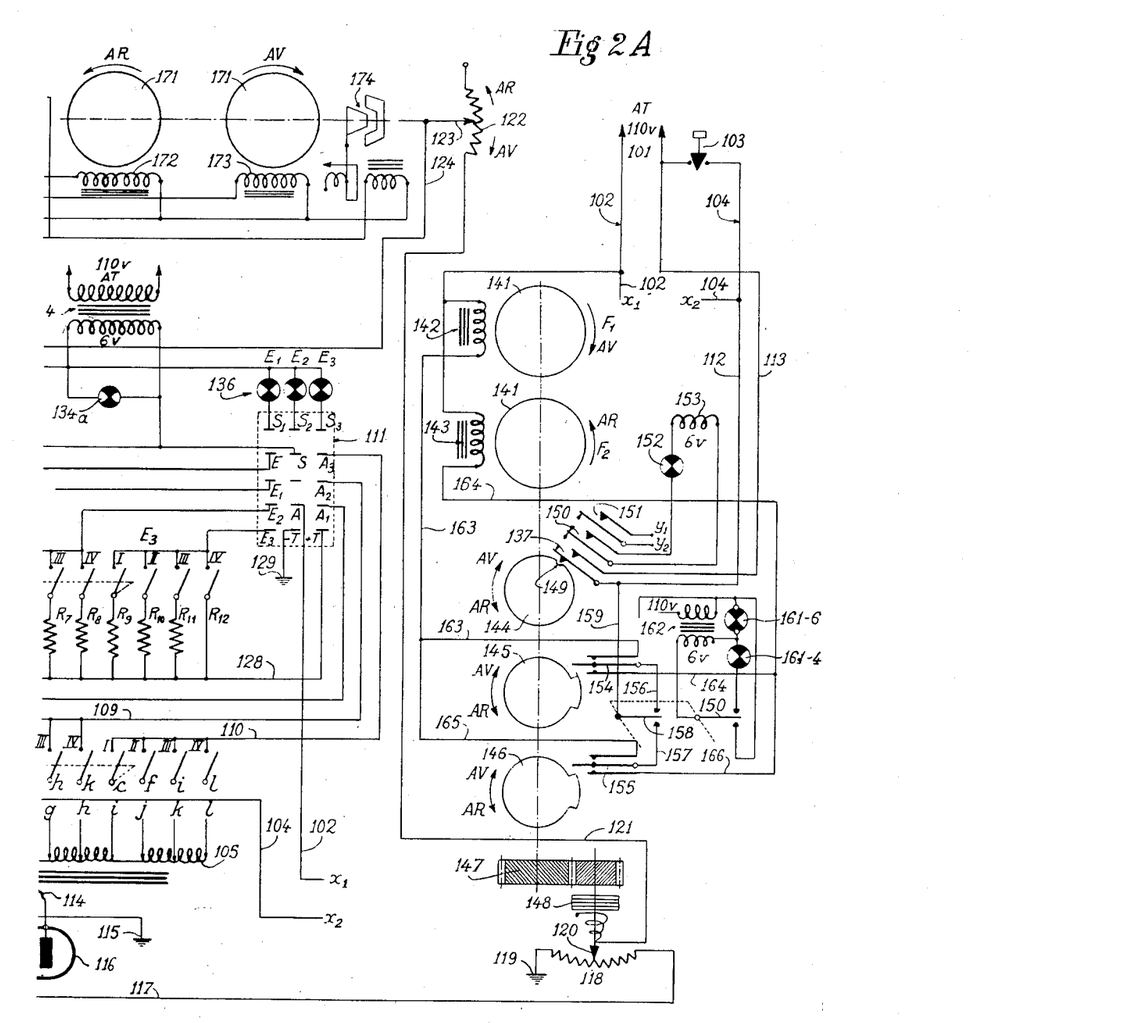

It will be seen that by means of this device, an intensity is obtained in the electrodes 18 which has a well-defined value in relation to the shunt selected, but which for each of these values is kept rigorously constant. A first form of a preferred embodiment of the invention is shown in Fig. 2 and will now be described.

The apparatus shown comprises a set of pairs of electrodes E1, E2, E3, having different sections of 200, 150 and 100 cm.$^2$ superficial area respectively, for example. They must be capable of being used for a certain number of treatment methods, four for example, hereinafter designated by I, II, III, IV, which require well defined current densities. The selection of a pair of electrodes and a current density thus determine an intensity that traverses the electrodes and the patient, this intensity thus being able to afford a certain number of different values. If, for example, the densities I, II, III and IV, have for values 5, 10, 20 and 50 respectively, we obtain ten different values for the intensity.

The various parts of the diagram will now be described separately.

The auto-transformer feeds a 110-volt alternating current at 101, the conductor 102 connected to a point $x1$ and, by means of a push-button 103 normally open, a conductor 104 connected to a point $x2$, these points $x1$ and $x2$ being connected to the points with the same reference numbers shown at the bottom of the diagram, or being merged with the latter, the connections between the two points $x1$ on the one hand, and between the two points $x2$ on the other, having been omitted solely for the sake of clearness in the diagram.

The conductor 104 traverses the tapped primary 105 of a transformer 106 connected to twelve tapping points marked $a$ to $l$, able to be connected by means of switches 107 each comprising a contact piece $a$ to $l$ connected to the tapping point with the same reference number of the winding 105, and an upper contact piece (according to the position shown in the diagram), these upper twelve contact pieces being connected four by four and thus forming three series of four contact pieces inside which the contact pieces bear the references I, II, III, IV of the four current densities utilised. Each group is connected by a conductor 108, 109 and 110 respectively, to the terminals A1, A2, A3 of a female plug 111 with multiple plugs, whose female terminal A is connected by the conductor 102 of the point $x1$ connected to the source 101, this stud A being able to be branched either with A1, A2 or A3, as will be seen later on.

It will be noticed that the point $x2$ communicates with the source 101 when the push-button 103 is closed. When this button is open, the terminal $X2$ can nevertheless communicate with the source of supply by the conductors 112 and 113 controlled by a "system for regulating the total time," as will also be seen later on.

The transformer 106 has a winding 114 for a secondary whose middle point is earthed at 115 and whose ends are connected to the plates of a double diode 116 whose filament is fed by a transformer 117 whose primary is connected to the auto-transformer of the general feed.

The tapping points $a$, $b$, $c$ etc. . . . are connected to the contact pieces with the same reference numbers of the switches 107, so that when one of these switches is closed it thus puts a portion of the primary 105 under tension, which allows a certain tension to be obtained for the rectified secondary current.

The three switches connected with the three studs I are coupled up, so as to be operated simultaneously. This also applies to the switches II, the switches III and the switches IV.

The rectified current supplied by the valve 116 emerges by a conductor 117 and traverses a potentiometer 118 whose end is earthed at 119 and whose slide contact 120 is connected by a conductor 121 to a variable resistance 122 provided with a slide contact 123 connected by a conductor 124 to a "regulating resistance" 125 mounted in series with the adjustable resistance 126 and a galvanometer 127 connected by a conductor 128 to a terminal $+T$, of the female plug 111. This female plug comprises another plug $-T$, earthed at 129 and it is between these terminals $-T$, $+T$ that the branching of the pair of treatment electrodes takes place.

An adjustable resistance 125a of greater value than the resistance 125, can be mounted in parallel with the resistance 125.

The above-mentioned circuit, formed by the conductors or other members 117, 118, 120, 121, 122, 123, 124, 125, 126, 127, 128, the two electrodes E1, E2 or E3 and which close by earthing at 129, form one of the branches of the "treatment circuit" traversed by the pulsated current.

Shunted on one part of this circuit, there are mounted in parallel with regard to each other, shunts R1 to R12 connected, by one of their ends to the conductor 128, by their other end, respectively to twelve switches 130 each able to be shunt-connected to a contact piece 131, the twelve contact pieces 131 forming three groups of four contact pieces, the four contact pieces of each group being united by the same conductor respectively to the terminals E1, E2, E3 of the female plug 111. Each of these terminals can be connected to a terminal E of this same plug 111 itself connected by a conductor 132 to the conductor 124 in such manner that each of the shunts can be selectively branched between the conductor 128 and the conductor 124, that is to say, shunted to the terminals of the resistances 125, 126 and the galvanometer 127. The three switches 130 connected with the contact pieces I are coupled up for simultaneous operating and this also applies to the similar switches connected with the contact pieces II, the contact pieces III and the contact pieces IV. Moreover, each of the switches 130–I, 130–II, 130–III, 130–IV, is coupled up with the corresponding switch 107–I, 107–II, 107–III, 107–IV. Consequently, by simultaneously closing the switches 130–I and 107–I, the mounting of the shunts R1, R5, R9 is prepared, as well as the branching on the transformer of the requisite plugs enabling the desired voltages to be obtained at the secondary, but the shunt R1, R5 or R9 is not actually put into circuit until the branching of the terminal E1, E2 or E3 that is adapted to the terminal E, is carried out. This branching takes place by means of a male plug connected to the end of the flexible cord of the pair of electrodes utilised. Each pair of electrodes is provided with a special plug comprising the male components corresponding to all the female parts of the plug 111, these male components being connected between each other so as to effect one of the connections E–E1, E–E2 or E–E3 according to the electrode E1, E2 or E3 selected. The various male components are moreover connected together so that by inserting the male plug, one of the connections A–A1, A–A2, A–A3 is made, so that by branching the pair of electrodes and closing the multiple switch corresponding to the treatment selected, the branching takes place automatically of the suitable shunt and the corresponding plug of the primary 105.

Four pilot lamps 133 mounted in parallel are fed under low voltage by a transformer 134; each of their respective circuits can be closed by one of the four switches coupled up to the corresponding switches 107 (I, II, III or IV) and 130 (I, II, III or IV). The same transformer feeds in parallel three pilot lamps 136 connected to the male plug 111 in such manner that the circuit of each of these lamps is closed by inserting the male plug E1, E2 or E3, respectively. The lighting of one of the lamps 133 thus indicates the type of treatment (or the current density) selected; the lighting of one of the lamps 136 thus indicates the type of electrodes branched. A lamp 134a directly branched on the secondary of the transformer 134 announces the putting under voltage of the general supply.

It will be seen that the connections made are as follows:
With the 200 cm.² electrodes: A–A1, E–E1, S–S1.
With the 150 cm.² electrodes: A–A2, E–E2, S–S2.
With the 100 cm.² electrodes: A–A3, E–E3, S–S3.

The primary circuit 105 of the transformer 106 passes through the points x1, x2 (at the top right-hand of the diagram), of which one, x1 is directly connected to the conductor 102. The point x2 being connected to the push-button 103, when this push-button is lowered, this circuit is under voltage; but as soon as this button returns to its normal raised position, the conductor 104 no longer communicates with the source 101 except through the intermediary of the conductor 112 and a contact-piece 137 controlled by the device for regulating the total time, which will now be described.

This device for regulating the total time comprises a reversible action motor 141, provided with two excitation windings 142, 143, respectively corresponding to the running of the motor in the two directions designated by the arrows F1 (forward running) and F2 (reverse running). In each direction, the motor revolves at a speed of 1 revolution per 4 minutes. It drives:
A "treatment cam" 144 revolving at the same speed;
A cam 145 making one revolution in 1½ minutes;
A cam 146 making one revolution in 2½ minutes; mechanical means of known type are provided to perform adequate revolution speed for each cam, such means are not shown in the drawings; a multiplying speed-gear box 147 with an automatic clutching and declutching device 148 of the known type, operating the slide contact 120 along the potentiometer 118.

The treatment cam 144 is disc-shaped and has a notch 149 co-operating with a pin of one of the plates of the contact 137, in such a manner that as soon as this cam is rotatively driven, it closes this contact 137 which closes two other contacts 150, 151; in closing, the contact 150 puts a warning lamp 152 under voltage fed by a winding 153, and the contact 151 closes the high tension circuit for regulating intensity which will be described farther on, the points y1, y2 of the contact 151 being connected to the points y1, y2 of the circuit for regulating intensity (left side of the diagram) or being merged with the latter, and the connections between the two points y1 on the one hand, and between the two points y2 on the other hand, having been omitted for the sake of clearness in the diagram.

The cam 145, called the "four-minute cam" and the cam 146 called the "six-minute cam" comprises a projecting part able to co-operate respectively with the movable arm of a two-pole connector 154 or 155, respectively, these arms being connected by conductors 156, 157 to the two studs of a two-pole switch 158 whose movable arm is connected by a conductor 159 to the conductor 112. This switch 158 is mechanically coupled up to another two-pole switch 160 whose operating results in the closing of the feed circuit of one of the two pilot lamps 161–4 or 161–6 respectively corresponding to the employing of the 4-minute cam and the 6-minute cam, these lamps being fed by a transformer 162.

The excitation windings 142 and 143 of the motor 141 are fed in parallel by the conductor 102 and are connected by the other end by the conductors 163 and 164 to two fixed studs of the two-pole switch 154; they are also connected, in the same way, by the conductors 165—166 to the two fixed studs of the two-pole switch 155.

The "four-minute" cam 145 and the clutch, declutching speed-gear box 147–148 are arranged in such manner that the slide contact 120 travels the whole length of the potentiometer 118 in thirty seconds, then disengages; the cam 145 after two minutes rotation in the forward direction comes into contact with the arm of the switch 154, normally in the high position (according to the position shown in the diagram) and returns it to the low position, which reverses the running direction of the motor and cam. The cam 146 is arranged in the same manner but acts on the switch 155 after a rotation carried out in three minutes. Thirty seconds before the motor completes its stroke, the clutch 148 comes into action to return the slide contact 120 in thirty seconds towards the end of the resistance 119 which is earthed; this arrangement can be obtained by all the known devices.

The device for regulating intensity operates by means of the potentiometer 122 whose slide contact 123 is driven in one direction or the other by a reversible motor 171 provided with two excitation windings 172, 173 and a brake fed under 110 volts through the intermediary of two groups of relays 175, 176 and 177, 178 themselves operated by magnetic core coils 179, 180 mounted in the plate circuits of two thyratrons 181, 182 of low power.

In the high tension circuit of these thyratrons the gap y1, y2 is inserted, whose opening and closing is controlled, as already described, by the treatment cam 149.

The two filaments of the two thyratrons are fed in parallel by the source 183 (the points z1, z2 of the thyratron 182) and the plate circuits are fed by the 110 volts source 184 through the intermediary of a rectifier 185. The cathodes of the two thyratrons are connected to the end (+) of the resistance 125 and the circuits of the control grids are connected:
To the end (—) of the resistance 125 for the thyratron 181;

At an intermediary point 186 adjustable on the resistance 125, for the thyratron 182.

Thus, this means that the control grids of the two thyratrons are polarized at different negative voltages, respectively corresponding to voltage drops in the resistance 125 and in the position comprised between (+) of that membrane and the point 186, when that resistance is traversed by the regulating intensity.

Any intensity variation in that resistance modifies its polarizations and releases a plate current in one of the thyratrons, which, through the intermediary of the corresponding relay, acts on the motor 171 in the proper direction for displacing the slide contact 123 in order to restore the intensity in the resistance 125 to the regulating value.

Figure 6:
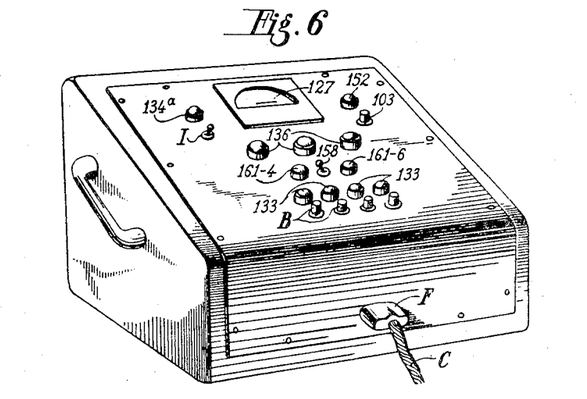
Fig. 6 is a perspective view of the apparatus according to the invention, of the form of embodiment corresponding to the diagram of Fig. 2.

The apparatus as shown in Figure 6 is in the form of a desk comprising a feed plug (not visible) and a female plug 111 (not shown) on which a multiple male plug F is mounted (corresponding to a diagram Fig. 3, Fig. 4 or Fig. 5) connected by a flexible cord C to the pair of electrodes utilised. On the upper surface of the apparatus, the following driving and controlling members are arranged, corresponding to the components of the diagram which bear the same reference numbers:

A general control switch 1 for the feed;

The luminous signal 134a indicating that the general feeding is put under voltage;

The operating push button 103;

The time selector inverter 158 enabling the choice to be made between operating for three minutes and five minutes;

A series of four control buttons B enabling the intensity of the currents to be selected according to the treatment applied, and which control the switches (107—130—135) of the diagram;

The series of four luminous signals 133 respectively indicating the density of the current utilised;

The series of three luminous signals 136 respectively indicating the type of electrode in circuit;

The luminous signal 152 showing that the treatment circuit is put under voltage;

The two signals 161-4 and 161-6 giving information about the treatment time;

The zero galvonometer 127.

This apparatus is utilized and operates in the following manner:

The operator having selected a pair of electrodes with a well-defined section and a well-defined current density, branches this electrode on to the apparatus by means of the male plug connected to this electrode, i. e., one of the plugs shown in Figs. 3, 4 and 5. The branching shown in the corresponding figure automatically ensues. If, for example, the operator has selected the 150 cm.$^2$ electrode shown in Figure 4, we see that the connections $AA_2$ automatically take place, fixing the feed voltage of the treatment current, the connection $EE_2$ preparing the connection of a group of shunts and the connection $SS_2$ which puts the corresponding luminous signal $E2$ into circuit. The operator having then selected a suitable current density determined by therapeutical reasons, presses the correct button which operates the corresponding switch putting one of the resistances, R1 to R12, into circuit; if, for example, the operator, after having branched in the 150 cm.$^2$ electrode, selects treatment II, he then presses on the second contact-piece thus closing the corresponding switch 107; this also causes the closing of one of the corresponding switches 135 which puts in circuit signal lamp 133 corresponding to treatment II. The choice of the treatment time takes place by operating the two-way button 158 which simultaneously actuates the switches 158 and 160 either towards the position at the top of the diagram corresponding to the employment of the four-minute cam 145, or to the lower position corresponding to the employment of the six-minute cam 146. It will be seen that the pilot light 161-4 or 161-6 is simultaneously put into circuit, its lighting up indicating the duration of the treatment selected. We will presume, for example, that the four-minute duration has been chosen.

The apparatus then being put under voltage by means of a general feed switch 1, and the putting under voltage having been signalled by the light up of the lamp 134a, starting up takes place by pushing on the push-button 103; this manoeuvre has the effect of closing the feed circuit of the motors 141 while feeding the winding in the direct sense 142 by the conductors 102 and 163, the switch 154 normally in the upper closed position, the conductor 156, the conductor 159, the conductor 112 and the conductor 104.

The motor having been put into motion, the treatment cam raises the lower plate of the contact piece 137 and thus closes this contact by consequently connecting the conductor 159 with the conductor 113 and thus closing the feed circuit which remains closed when the push-button 103 is released and returns to its normal open position. The motor 141 is started up forward. The automatic disengaging speed-gear box operates as described above and the stroke of the slide contact 120 occurs in 30 seconds, regularly raising the treatment voltage to its proper value. The cam 144 makes a forward revolution in 2 minutes and then acts on the middle plate of the contact 154 which it restores to the low position. The feed to the coil 142 is then cut off and the coil 143 placed under voltage and consequently there is a reverse in the running direction of the motor 141; the cam 144 then revolves in the reverse direction, and at the conclusion of its stroke restores the middle plate of the switch 148 to its original position, but the projecting part of the movable plate of the contact 137 falls back again into the notch 149 of the treatment cam 144; consequently, the cutting off of the feed current occurs and the motor stops; at the beginning of its motion, the treatment cam 144 has closed the contacts 150 and 151; the treatment lamp 152 has lit up, and the thyrathrons have been placed under voltage and have acted in the way stated above to keep the intensity constant in the shunted circuit, and consequently, in the shunt branched at the terminals of this circuit. The galvonometer 127 moreover enables a check to be made to see that the intensity is maintained at its exact value and within the tolerances permitted. In this manner, whatever the resistance of the patient, a practically constant intensity is obtained which thus allows a given current density to be achieved for a given electrode superficial area.

Lastly, as described above, during thirty seconds of the application period, the backward movement of the slide contact 120 progressively restores the treatment voltage to zero.

In the case where the 6 minute duration has been chosen by putting the switch 158 to the low position (as shown in the diagram) working is quite similar to that which has just been described.

This apparatus thus enables the various parameters chosen to be automatically ascertained, without any computation and with the minimum of operating. The values of the various members are given below, but purely as examples.

If, for example, we select electrodes of 100, 150 and 200 cm.$^2$ and current densities of 5, 10, 20, 50 ma./cm.$^2$, we see that the intensities in the shunts may vary between a minimum of 0, 5 and a maximum of 10 milliamperes. The time regulating resistance for rise and drop 118 is preferably substantially of 1000 ohms, and the regulating resistance 182, 16,000 ohms. The thyrathrons can, for example, be of the 2D21 type.

The times of four minutes and six minutes can obviously also be modified, and have only been quoted as examples.

Lastly, instead of merely being rectified, the treatment current could be modulated in any suitable manner.

This apparatus, moreover, needs not necessarily be produced in the electro-mechanical form described above, and a second form of embodiment is shown and described by way of example, in which the total time regulating, intensity regulating, and regulating of the rise and drop time are carried out by purely electronic means.

Figure 7:
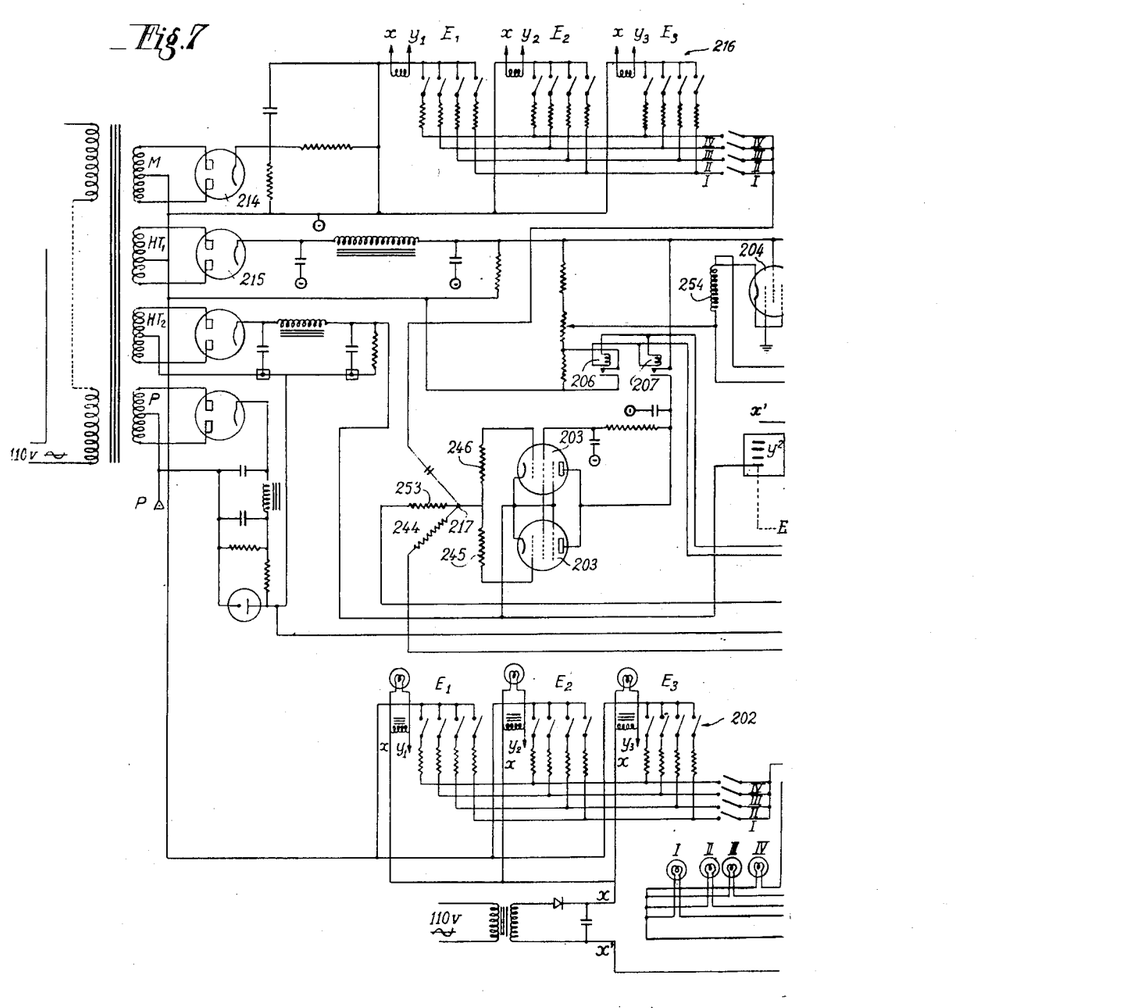
Figs. 7 and 7A are electrical diagrams of a second form of embodiment of the invention.
Figure 7A:
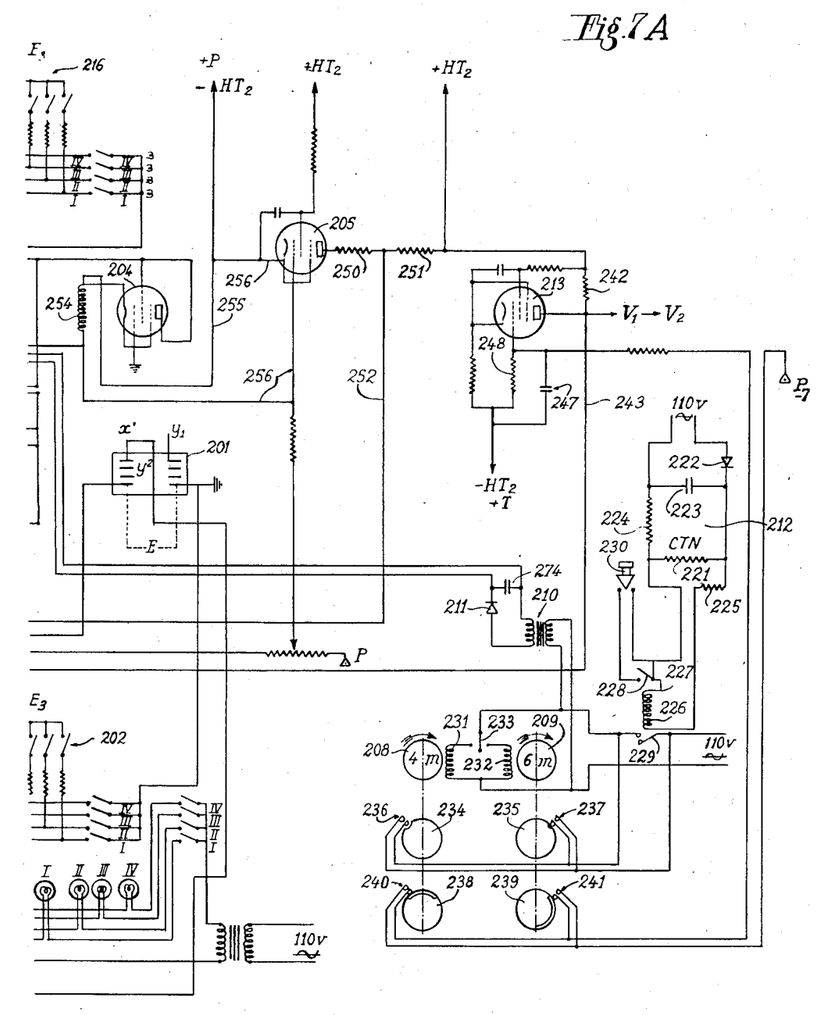

One form of embodiment according to this alternative scheme is shown in Fig. 7. In a general way, this apparatus comprises the same essential parts as the preceding apparatus, and in the description of this second form of embodiment, no stress will be laid on the parts whose achievement is distinctly different from the corresponding parts of the apparatus described above or of known technique.

We thus find in this second apparatus, a current source feeding a treatment circuit traversing a pair of special electrodes E, branched by means of a multiple plug 201, the intensity being able to be fixed at a value depending on the electrode and the treatment method selected, by means of twelve resistances 202 connected by means of switches corresponding to the treatment I, II, III or IV selected, and the branching of the electrode E1, E2 or E3 utilised.

This treatment current traverses a resistance made up by cathode-plate spaces in two pentodes 203, mounted in parallel this resistance being able to be regulated by means of a system (described further on) of intensity regulating, more particularly comprising two pentodes 204 and 205. The treatment circuit is put under voltage and the circuit for regulating intensity is put under voltage by two relays 206 and 207 simultaneously operated by a device for regulating the treatment time (described further on) and more particularly comprising two motors 208 and 209, by the intermediary of a transformer 210 and a rectifier 211. This device or regulating device for the treatment time is itself operated by a starter circuit 212 and operates a circuit for the progressive application and suppression of the current more particularly comprising a pentode 213; lastly, the apparatus also comprises signalling lamps indicating the nature of the treatment selected and the type of electrodes branched in.

Nevertheless, the apparatus according to the second form of embodiment comprises, in addition to a modulation circuit fed by a double diode 214 allowing the superimposition, in a dosable proportion, of a component alternative to the rectified and by-passed current supplied by a double diode 215 fed by the treatment circuit, this dosage being effected by means of resistances 216, and this modulation being applied at 217 to the control grid of each of the pentodes 203.

Lastly, this apparatus comprises principal and auxiliary transformers for feeding the various members of the apparatus, and rectifying and by-passing circuits supplying the necessary plate and polarization voltages. The heating circuits have not been shown in the diagram, for the sake of simplicity.

More particularly, we shall now describe the circuits for starting up and controlling the treatment time, regulating the time of rise and drop of the treatment current, and intensity regulating.

The starting device 212 is characterized by the employing of a resistance 221 having a strong negative temperature co-efficient (NTC) of the known type, the value in ohms of this resistance being, in the cold state, very much greater than when hot. A first circuit fed by the 110 volt alternating current comprises a rectifier 222, with condenser 223, the resistance 221 and a resistance 224.

Shunted on this resistance 221 a second circuit is mounted comprising a resistance 225, a coil 226, a relay 227, with two normally opened contacts 228, 229 and the contact 228 of the relay; shunted on this contact is mounted a push-button 230 that is normally open.

When this circuit is closed by means of the push-button 230, the relay is excited, it closes its two contacts 228 and 229 and remains self-excited. Two currents are then present, one traversing the resistance 225 and the coil 226 of the relay, the other traversing the resistance 221, the sum of these two currents traversing the resistance 224. The current intensity in the resistance 221 increases according as the resistance decreases owing to the rise in temperature due to the passage of the current; the total intensity in the resistance 224 thus increases and the voltage available at the terminals of the relay 227 decreases. After a certain time $t$, which may be regulated by the value of the members of the circuit, this voltage is insufficient for maintaining a sufficient excitation in the relay; the latter becomes released and would only be put under voltage by subsequently operating the push-button 230.

The two contacts 228, 229 are now open, but although the contact 229, which controls the circuit for regulating the application time may be open, this circuit remains under voltage, as will be seen further on.

This circuit comprises the motors 208, corresponding to the four-minute treatment and 209, corresponding to the six-minute treatment respectively excited by the inductors 231, 232, selectively fed by the alternating source at 110 volts, through the intermediary of the contact 229 of the relay 227 and a two-pole switch 233 for treatment selection.

Each of the motors drives a stop cam 234 or 235 similar to that of the first apparatus, each of them controlling, by its rotation, the closing of a contact 236 or 237 mounted in shunt on the contact 229.

When one of the cams 234 or 235 commences to revolve, it closes the corresponding contact 236 or 237, and keeps under voltage the feed circuit of the motor that drives it, whereas the push-button 230 has returned to its open position, and that until the cam has made its complete revolution and the stud of the plate which presses on this cam has dropped into its notch.

Furthermore, each of the motors drives a cam 236 or 239 called a "cam for the progressive application and suppression of the current," controlling the contacts 240, 241, mounted in parallel with regard to each other, and mounted in series in a circuit connecting the polarization voltage P to the control grid of the pentode 213 which controls the rise and drop of the treatment current, as will be seen further on.

By way of example, the following values may be given to the members forming the above-mentioned starting circuit:

Condenser 223 (16 microfarads).
Resistance 224 (350 ohms).
Resistance 225 (875 ohms).
Coil resistance 226 (350 ohms).
The resistance 221 being of the 100026.01 type.

It will be noticed that the closing of the contact 229, while it puts the motor 208 or 209 under voltage also puts the relays 206 and 207 under voltage which close the treatment and regulating circuits, respectively.

The device for regulating the time of the rise and drop of the current is effected by electronic means, constituted essentially by the pentode 213, which may be, for example, a pentode EF42, whose grid, as stated above, is connected to the source of polarization voltage through the intermediary of the progressive treatment application. This pentode 213 comprises in its plate circuit, a load resistance 242 connected by a conductor 243, and through the intermediary of the resistance 244 and the resistances 245, 246 to the control grids of two pentodes 203 traversed by the treatment current.

In the grid-cathode circuit of the pentode 213 a large capacity condenser 247 is mounted shunted on a resistance 248 of suitable value, to obtain a time constant of suitable value corresponding to the rising (and dropping) time of the treatment current; for example, values of 1,000 microfarads and 20K could be adopted for this condenser and this resistance.

The apparatus being in the "standing by" position (tubes heated, but treatment not started) the pentode 213 delivers a current; the drop of potential through the load resistance 242, means that there will be, in the grid circuit of the pentodes 203, a certain negative polarization voltage VI sufficient to lock these pentodes. When starting the treatment (zero time), a certain negative voltage T is applied to the condenser 247 by the action of the cam 240 or 241, which will completely lock pentode 213 when this condenser 247 is under load.

With the values permitted, the load time is in the vicinity of 30 seconds, this time reaches the tube 213 no longer delivering any current, the drop of potential in the resistance 242 is cancelled; the polarization of the tubes 203 takes a value $V_2$ less negative than $V_1$ and these tubes are freed.

Thirty seconds before treatment finishes, the negative voltage applied to the condenser 247 is cancelled, whose discharging time in the resistance 248 is about 30 seconds. At this moment, the current in the pentode 213 progressively re-appears and the drop of potential resulting therefrom in the resistance 242 causes the locking of the regulating pentodes 203 by a mechanism similar to that described above.

The device for regulating intensity is also entirely electronic. This regulating is obtained by the action on the control grid voltage of the pentodes 203 (EL34 type, for example) traversed by the current of the treatment electrodes; when the grid voltage is strongly negative, the internal resistance of the pentodes 203 is high and the current which is delivered is weak; if, on the other hand, the grid voltage becomes slightly negative, the internal resistance becomes weak and the current assumes a higher value.

The control grid voltage of the tubes 203 is supplied by the plate current of the pentode 213 (an EF42, for example) the reference voltage being taken on the bridge formed by two resistances 250, 251, mounted in series in the plate circuit, and transmitted to the grids of the pentodes 203 by the conductor 252 and the resistance 253.

The basic element is a resistance 254 with negative temperature coefficient (NTC) comprising the resistance properly so called and a heating filament ($S=100$) surrounding the latter to modify its temperature. The temperature of the heating filament rises in relation to the mean current; this device thus enables the current intensity to be regulated, no matter what its form may be.

The heating member of the resistance 254, is mounted in the cathode circuit of the amplifier tube formed by the pentode 204 and is traversed by the regulating current.

A variation in the treatment current involves a variation in the voltage at the terminals of the heating resistance of 100 and the voltage applied to the cathode of the pentode 204; the grid of the pentode 204 being earthed, the polarization of the grid with regard to the cathode varies and the beginning of the tube 204 varies, and modifies the temperature of the heating filament of the resistance 254 and the resistance of the thermo-negative part of the latter. This thermo-variable resistance inserted between the grid of the cathode and the second pentode 205, by the conductors 255 and 256, the plate current of this pentode 205 will thus vary in relation to the temperature variations of the resistance 254.

Furthermore, the plate current of the pentode 205 can act on the reference voltage of the grids of the pentodes 203, by the conductor 252. In short, any increase of the treatment current will take from the potential of the cathode of the tube 204 a value nearer the earth potential, and will increase the current delivered and the temperature of the heating filament of the resistance 254, which will reduce the resistance of the thermo-negative member and take a more positive value at the grid of the tube 205. This tube consumes more, the drop of potential in its plate load increases, and the potential of the grids of the pentodes 203 takes a negative value which opposes an increase of current.

By an inverse process of the foregoing, the assembly is also opposed to any reductions of the treatment current.

We thus see that the apparatus according to this second form of embodiment operates in the same automatic conditions as the first apparatus described, and enables, after having selected the treatment method, a type of electrodes and treatment time to be chosen, and to apply them automatically to the patient, the intensity being progressively applied, automatically maintained constant during the time chosen, progressively suppressed.

The invention is not restricted to the forms of embodiment shown and described which have been selected as examples.

What I claim is:

1. A device for the control of electrical supply for electro-therapeutic purposes, more particularly for stimulotherapy, comprising a source generating a main alternative current, a double rectifying diode fed by said source, a treatment circuit connected to said double rectifying diode, at least one pair of treatment electrodes inserted in said circuit, a plurality of resistances, inserted in said circuit, some at least of said resistances having a variable value, a plurality of regulators in said circuit fed by said source and connected with said variable resistances for varying the value thereof; control devices associated with certain at least of said regulators, said control devices varying the current admitted to said regulators, further control means for said resistances having fixed values, the operation of said further control means being performed in accordance with the selected type of electrodes, the ohmic resistance of the patient subjected to the treatment, the duration of application of the electrical treatment and the chosen electrical density.

2. A device according to claim 1 comprising signalling means in connection with each electrode circuit and with certain at least of said resistances having fixed values and being responsive to a determined current density and to a determined duration of the treatment.

3. A device according to claim 1, comprising means inserted in said treatment circuit for creating in said circuit a current of low intensity and increase said intensity progressively to a chosen value and to return it to zero in an equally progressive manner.

4. A device according to claim 3, wherein the means for the progressive applying and suppressing of the current comprises a motor and a potentiometer with slide contact in connection with said motor, said contact sliding from its zero position to a predetermined position at the beginning of the treatment and returning to its zero position at the end of the treatment.

5. A device according to claim 1, wherein at least one of said regulators regulates the application time and comprises an electric motor having a shaft, a plurality of cams on said shaft, a starting circuit and a control circuit, a device for the reversion of the rotation of said motor controlled by one of said cams and further cam means controlling the control circuit and the starting circuit of said motor.

6. A device according to claim 1, comprising a series of plugs, each having two contacts corresponding to a certain value of the intensity of the treatment circuit and consequently to a given number of resistances inserted in said circuit and a series of electrodes having different superficial areas and provided with connecting pin-plugs adapted to be selectively inserted into said plugs.

7. A device for the control of electrical supply for electrotherapeutic purposes, more particularly for stimulotherapy, comprising a source of generating a main alternative current, at least two double rectifying diodes fed by said source, a by-pass circuit connected to one at least of said double rectifying diodes, resistances connected to said diodes and said by-pass circuit, the value of said resistances being chosen in accordance with a chosen dosage between currents given distinctly by said diodes, a treatment circuit connected to said resistances, at least one pair of treatment electrodes inserted in said circuit, a plurality of further resistances inserted in said circuit, some at least of said further resistances having a variable value, a plurality of regulators in said circuit fed by said source and connected with said variable further resistances for varying the value thereof, control devices associated with certain at least of said regulators, said control devices varying the current admitted to said regulators, further control means for said further resistances having fixed values, the operation of said further control means being performed in accordance with the selected type of electrodes, the ohmic resistance of the patient subjected to the treatment the duration of application of the electrical treatment and the chosen electrical density.

8. A device according to claim 7, wherein one at least of said control device is constituted by two pentodes having conventional grids and plates, inserted in the treatment circuit by a control tube and by a bridge formed by two resistances, the grids of said pentodes being connected together with the plate circuit of said control tube and with said bridge which is inserted in the circuit of a further control device.

9. A device according to claim 8, wherein said further control device is intended for the intensity regulation of said treatment circuit comprising a tube with a plate and a grid, a further resistance with a negative temperature coefficient and an amplificating tube, the plate circuit of said tube being connected to said bridge, whereas the grid is connected to said resistance with a negative temperature coefficient and further a heating member for said resistance mounted in the cathode circuit of said amplificating tube and inserted in the treatment circuit.

10. A device according to claim 8, wherein said control tube is intended for the regulation of the rise and drop of said treatment current, the grid cathode circuit of said tube comprising a large capacity condenser and a resistance of suitable value to obtain a suitable rising and dropping time of the treatment current, said condenser being mounted shunted on said resistance.

11. A device according to claim 10, comprising a negative voltage source, and connecting means for the connection thereof with said large capacity condenser, said connecting means comprising a contact piece and a cam closing said latter, such arrangement being intended for the locking of said control tube when said condenser is under load.

12. A device according to claim 10, wherein said control tube is further intended for the locking of the two said pentodes and comprises a load resistance inserted in its plate circuit, said load resistance being connected to the grid of said pentodes, so as to deliver a negative polarization voltage to said grids when traversed by a current.

13. A control device according to claim 12, wherein the device for controlling the application time comprises two motors, a two-way-switch for selectively actuating said motors, each motor corresponding to a well defined time, and driving a cam for maintaining and breaking the circuit and an application cam for the current controlling the polarization of the grid of the control tube.

References Cited in the file of this patent

UNITED STATES PATENTS

| | | |
|---|---|---|
| 1,752,632 | De Beaumont et al. | Apr. 1, 1930 |
| 2,099,511 | Caesar | Nov. 16, 1937 |
| 2,182,223 | Dobert | Dec. 5, 1939 |
| 2,295,585 | Lindquist | Sept. 15, 1942 |
| 2,375,575 | Morland et al. | May 8, 1945 |
| 2,543,248 | Ledeboer et al. | Feb. 27, 1951 |
| 2,650,990 | Woodruff | Sept. 1, 1953 |
| 2,698,622 | Martens | Jan. 4, 1955 |